(12) United States Patent
Yonemoto et al.

(10) Patent No.: US 10,782,272 B2
(45) Date of Patent: Sep. 22, 2020

(54) ANALYTICAL METHOD FOR PRECIPITATED PARTICLES DURING CO-PRECIPITATION REACTION

(71) Applicant: Microvast Power Systems Co., Ltd., Huzhou, Zhejiang Province (CN)

(72) Inventors: Bryan Yonemoto, Clearwater, FL (US); Xiao Zhang, Huzhou (CN); Wenjuan Liu Mattis, Huzhou (CN); Zhifeng Zhang, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 217 days.

(21) Appl. No.: 16/035,725

(22) Filed: Jul. 16, 2018

(65) Prior Publication Data

US 2019/0017979 A1    Jan. 17, 2019

Related U.S. Application Data

(60) Provisional application No. 62/532,997, filed on Jul. 15, 2017.

(51) Int. Cl.

| | | |
|---|---|---|
| *G01N 31/22* | (2006.01) | |
| *G01N 31/02* | (2006.01) | |
| *B01J 19/00* | (2006.01) | |
| *B01J 8/00* | (2006.01) | |
| *C01G 19/02* | (2006.01) | |
| *C01F 11/24* | (2006.01) | |
| *C01G 53/00* | (2006.01) | |

(52) U.S. Cl.
CPC .............. *G01N 31/22* (2013.01); *B01J 8/006* (2013.01); *B01J 19/0006* (2013.01); *C01F 11/24* (2013.01); *C01G 19/02* (2013.01); *C01G 53/006* (2013.01); *G01N 31/02* (2013.01); *B01J 2208/00557* (2013.01); *B01J 2208/00663* (2013.01); *B01J 2219/00707* (2013.01); *C01P 2002/89* (2013.01)

(58) Field of Classification Search
CPC .......... B01J 19/0006; B01J 2208/00557; B01J 2208/00663; B01J 2219/00707; B01J 8/006; C01F 11/24; C01G 19/02; C01G 53/006; C01P 2002/89; G01N 31/02; G01N 31/22

USPC ........ 436/55, 56, 73, 77, 79, 80, 81, 83, 84, 436/174, 177; 422/527, 534

See application file for complete search history.

(56) References Cited

U.S. PATENT DOCUMENTS

| | | | |
|---|---|---|---|
| 8,591,774 B2 | 11/2013 | Koenig, Jr. et al. | |
| 2016/0036043 A1* | 2/2016 | Dai | C01G 51/50 428/402 |
| 2018/0114985 A1* | 4/2018 | Volkov | H01M 4/131 |
| 2019/0312265 A1* | 10/2019 | Yonemoto | H01M 4/525 |
| 2019/0372110 A1* | 12/2019 | Nam | C01G 53/006 |
| 2020/0020944 A1* | 1/2020 | Park | H01M 4/131 |
| 2020/0031682 A1* | 1/2020 | Paulsen | H01M 4/485 |

FOREIGN PATENT DOCUMENTS

| | | |
|---|---|---|
| CN | 100593253 C | 3/2010 |
| CN | 103326016 A | 9/2013 |

* cited by examiner

*Primary Examiner* — Maureen Wallenhorst
(74) *Attorney, Agent, or Firm* — Cheng-Ju Chiang

(57) ABSTRACT

An analytical method for precipitated particles using a co-precipitation reaction in includes feeding streams and a tracking metal into a reaction vessel; collecting a precipitated product containing the tracking metal from the reaction vessel in increments of time to obtain product samples; filtering each collected product sample to separate precipitated particles from filtrate; and performing elemental analysis for the tracking metal in the precipitated particles of each collected product sample and measuring a concentration of the tracking metal in the precipitated particles, to obtain a residence time distribution of the precipitated particles in the reaction vessel according to the concentration of the tracking metal in the precipitated particles. Therefore the preferred residence time of the precipitated particles in the reaction vessel can be ascertained, so that it is clear when the precipitated particles should be collected from the reaction vessel.

13 Claims, 3 Drawing Sheets

ANALYTICAL METHOD FOR PRECIPITATED PARTICLES DURING CO-PRECIPITATION REACTION

CROSS-REFERENCE TO RELATED APPLICATION

This invention is based on and claims the priority of provisional application No. 62/532,997, filed on Jul. 15, 2017. The entire disclosure of the above-identified application is incorporated herein by reference.

TECHNICAL FIELD

This invention generally relates to an analytical method for precipitated particles during co-precipitation reaction and more particularly to an analytical method for ascertaining the preferred residence time of precipitated particles in a reaction vessel during co-precipitation reaction, so as to know when the precipitated particles should be collected from the reaction vessel.

BACKGROUND

Concentration gradient materials—core-shell, multilayer core-shell and full concentration gradient—are of interest for many topics including catalysis, energy storage, drug delivery, photovoltaics, sensors and water treatment, to name a few. In some cases, especially for energy storage cathodes, these materials are prepared via co-precipitation reactions from primarily first row transition metals, such as Ni, Mn and Co (NMC). While the interest in these materials is high, the processing conditions are difficult to analyze. New analytical methods are therefore needed to determine the complicated interplay between processing, layer thickness, and material performance, especially when concentration gradient materials are prepared continuously.

Concentration gradient precursor particles can be prepared via co-precipitation in mixed vessels. For NMC materials prepared via core-shell, multilayer core-shell or full concentration gradient co-precipitation as disclosed in CN100593253, CN103326016, or U.S. Pat. No. 8,591,774, the actual thickness of a feed composition, or feed range, is challenging to analyze without expensive and rare equipment.

SUMMARY

For continuous reactions comprising a single vessel or numerous vessels connected in series, the present invention is aimed to ascertain the preferred residence time of precipitated particles in the reaction vessel during co-precipitation reaction, so as to know when the precipitated particles should be collected from the reaction vessel. The residence time represents the time a particle or a fluid resides within a specific reaction vessel. The residence time of the precipitated particles can be described by a distribution in time. The mean residence time is the relationship between the average hold-up time divided by the throughput.

The problem to be solved:

This invention provides a method for measuring the residence time distribution of liquid phase for continuous co-precipitation reaction vessels.

This invention provides a method for measuring the residence time distribution of solid phase for continuous co-precipitation reaction vessels.

This invention can also be used to compare if the residence time of the solid phase and the residence time of the liquid phase are the same, or if the solid phase or the liquid phase exits the reaction vessel faster or slower.

The present invention provides an analytical method for precipitated particles during co-precipitation reaction, comprising:

running a co-precipitation reaction in a reaction vessel to form a precipitated product; injecting a tracking metal to the reaction vessel for a given time duration;

collecting the precipitated product containing the tracking metal from the reaction vessel in increments of time to obtain multiple product samples;

filtering each collected product sample to separate precipitated particles from filtrate;

performing elemental analysis for the tracking metal in the precipitated particles of each collected product sample, to obtain the residence time distribution of the precipitated particles in the reaction vessel according to the concentration of the tracking metal in the precipitated particles.

By the analytical method, the preferred residence time of the precipitated particles in the reaction vessel can be ascertained, so that it is clear when the precipitated particles should be collected from the reaction vessel.

DETAILED DESCRIPTION OF PREFERRED EMBODIMENTS

Figure 1:
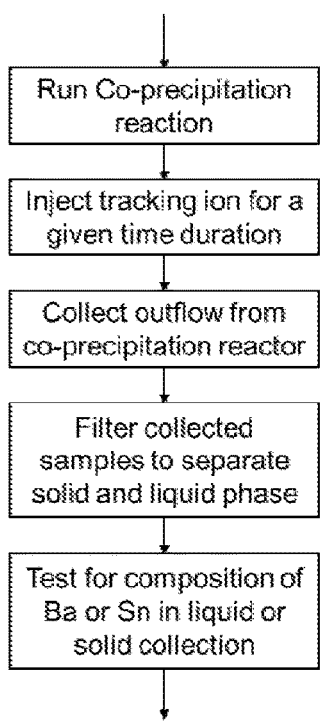
FIG. 1 is flow diagram for an analytical method according to an embodiment of the present invention.

In one embodiment, the present analytical method can be used to determine the residence time distribution of the fluid in the co-precipitation reaction vessel. The general procedure is as follows (see FIG. 1):

1. A stream (A) containing precipitation cation(s) and a stream (B) containing precipitation anion(s) are added to a reaction vessel for co-precipitation reaction. Tracking ions dissolved in the stream (A), (B) or provided in a separate stream (C) are also added to the reaction vessel. Additional feed streams may be present to add additional species to the reaction vessel. The addition of tracking ions to the reaction vessel will occur for a selected period of time, either as highly concentrated short burst or until the tracking metal reaches a steady state concentration (i.e., the species concentration will no longer change with time if additional feed is provided) before ceasing addition. In the reaction vessel, the steams (A) and (B) are contacted to form precipitated particles. For example, precipitated cathode precursor particles may be formed in the reaction vessel as a result of co-precipitation reaction, and the precipitated cathode precursor particles may be used to produce a cathode active material for non-aqueous lithium-ion batteries. The tracking ions added into the reaction vessel are partially or fully soluble in the fluid, resulting in a concentration in the liquid phase of the eventual filtrate.

2. The fluid containing the tracking metal will flow out of the reaction vessel and is collected. The product including the precipitated particles and the fluid in the reaction vessel should be collected in increments of time. For example, the product exiting the reaction vessel is collected and binned at intervals such as 30 minutes, to thereby obtain multiple product samples.

3. Each collected product sample is filtered to remove the solids (i.e., the precipitated particles), so that the filtrate (i.e., the fluid in the reaction vessel) is separately obtained.

4. Elemental analysis for the tracking ions in the filtrate is performed for each collected product sample, to obtain the residence time distribution of the fluid in the reaction vessel according to the concentration of the tracking metal in the filtrate, thereby providing information on the residence time distribution of the fluid in the reaction vessel being studied.

In one embodiment, the present analytical method can be used to determine the residence time distribution of the precipitated particles in the co-precipitation reaction vessel. The general procedure is as follows (see FIG. 1):

1. A stream (A) containing precipitation cation(s) and a stream (B) containing precipitation anion(s) are added to a reaction vessel for co-precipitation reaction. Tracking ions dissolved in the stream (A), (B) or provided in a separate stream (C) are also added to the reaction vessel. Additional feed streams may be present to add additional species to the reaction vessel. The addition of tracking ions to the reaction vessel will occur for a selected period of time, either as highly concentrated short burst or until the tracking metal reaches a steady state concentration before ceasing addition. In the reaction vessel, the steams (A) and (B) are contacted to form precipitated particles. For example, precipitated cathode precursor particles may be formed in the reaction vessel as a result of co-precipitation reaction, and the precipitated cathode precursor particles may be used to produce a cathode active material for non-aqueous lithium-ion batteries. The tracking ions added into the reaction vessel will precipitate from contact with appropriate anions, and will become imbedded or solubilized within the precipitated particles. Thus, the precipitated particles formed in the reaction vessel will contain the tracking ions.

2. The precipitation particles containing the tracking metal will flow out of the reaction vessel and is collected. The product including the precipitated particles and the fluid in the reaction vessel should be collected in increments of time. For example, the product exiting the reaction vessel is collected and binned at intervals such as 30 minutes, to thereby obtain multiple product samples.

3. Each collected product sample is filtered to obtain the solids (i.e., the precipitated particles), the precipitated particles are then washed to remove the byproduct salts from the precipitated particles, and then dried.

4. Elemental analysis for the tracking ions in the precipitated particles is performed for each collected product sample, to obtain the residence time distribution of the precipitated particles in the reaction vessel according to the concentration of the tracking metal in the precipitated particles, thereby providing information on the residence time distribution of the precipitated particles in the reaction vessel being studied.

In one embodiment, the filtrate and the solid precipitated particles are jointly studied with elemental analysis, so that the procedure determining the residence time distribution of the fluid and the procedure determining the residence time distribution of the precipitated particles are done concurrently.

Preferred embodiments of all procedures:

The pH in the co-precipitation reaction vessel is maintained from 7-14, preferably from 8.5-12, more preferably from 8.5-10 or 10.5-12.

The tracking ion is selected from a cation that will precipitate under the processing conditions, and has a distinct a.m.u. (atomic mass unit) or spectroscopic signature, obvious to one skilled in the art, that will allow it to be distinguished from the precipitated product. More preferred, the tracking ion is selected from $Ba(NO_3)_2$, $BaO$, $Ba(OH)_2*xH_2O$, $BaS$, $BaCO_3$, $BaSO_4$, $BaCl_2$, $BaBr_2$, $BaF_2$, $Ba(ClO_4)_2$, $SnSO_4$, $SnCl_2$, $Sn(NO_3)_2$, $SnBr_2$, $SnF_2$, $SnCO_3$, $Sn(OH)_2$, or any combinations thereof.

In a preferred embodiment, the stream (A) is selected from first row transition metals and has a concentration from 0.001-6 (mol cation/L), the stream (B) is selected from $LiOH$, $NaOH$, $KOH$, $Na_2CO_3$, $NaHCO_3$, $NH_3*H_2O$, or any combination thereof and has a concentration from 0.001-14 (mol anion/L).

The feed concentration of the tracking ion is in the range between 0.001-1 (mol tracking ion/L), preferably in the range between 0.1-1 (mol tracking ion/L).

The present invention describes an analytical method to study the processing and resulting particles prepared via co-precipitation reactions in the reaction vessel. The analytical method not only provides information on the residence time distribution of the precipitated product that is difficult to obtain otherwise, but also is useful in correlating processing changes to the effect on the final concentration gradient material prepared.

In some embodiments, the present analytical method is used to determine the residence time distribution of the fluid phase within a continuous co-precipitation reaction vessel. Without a tracking ion, it is impossible otherwise to distinguish the age of fluid exiting the vessel. The analysis also gives analytical data that can be used to measure the mean, range and skewness of the fluid phase residence time.

In some embodiments, the present analytical method is used to determine the residence time distribution of the precipitated particles. The method gives information on the age of particles exiting the vessel, which would otherwise be indistinguishable from other product outflowing from the continuous process. The method also provides a way to measure the mean, range and skewness of the solid phase residence time.

In some scenarios, the residence time of the fluid and the solid phase (i.e., the precipitated particles) is collected concurrently. By comparing the resulting residence time data of the two phases, a qualitative indicator is available to identify if accumulation of the solid product within the processing vessels is occurring.

Example 1

Adding Sn as Analytical Tracker During Co-Precipitation Reaction

A 4 L co-precipitation vessel with pH sensor and a heating jacket to maintain the temperature at 50° C. is filled with 10.2 g/L $NH_3$ solution. Gentle stirring is started, and the pH is adjusted to 12. After the pH is set, the mixture is stirred at 1000 rpm. Separately, a 2 mol/L metal sulfate solution of $CoSO4*7H2O$, $MnSO4*H2O$ and $NiSO4*6H2O$, with Co:Mn:Ni ratio of 0.1:0.15:0.75 is prepared in a separate tank. At the start of the reaction, the metal sulfate solution is fed into the vessel, along with aqua ammonia (25 wt %) and sodium hydroxide (30 wt %) to keep the NH3 and pH constant in the mixing vessel. The feeds are designed to give a 3 hr residence time from starting feeding. The collected product particles steadily leave the vessel via an overflow port. At the start of the second 3 hr, a 0.5 mol/L solution of $SnSO_4$ is pumped into the vessel for 30 minutes.

At the end of the 30 minutes of $SnSO_4$ addition to the vessel, the product including the precipitated particles and the fluid in the vessel is collected in increments of time. In the example, the product exiting the vessel is collected at intervals of 30 minutes (i.e., the product is collected every 30 minutes), with each time of collection lasting for 2 minutes. The product collected each time is separated via qualitative 11 um filter paper to obtain liquid (i.e., filtrate) and particles for additional testing.

Measuring the Residence Time of the Liquid and the Particles

Figure 2:
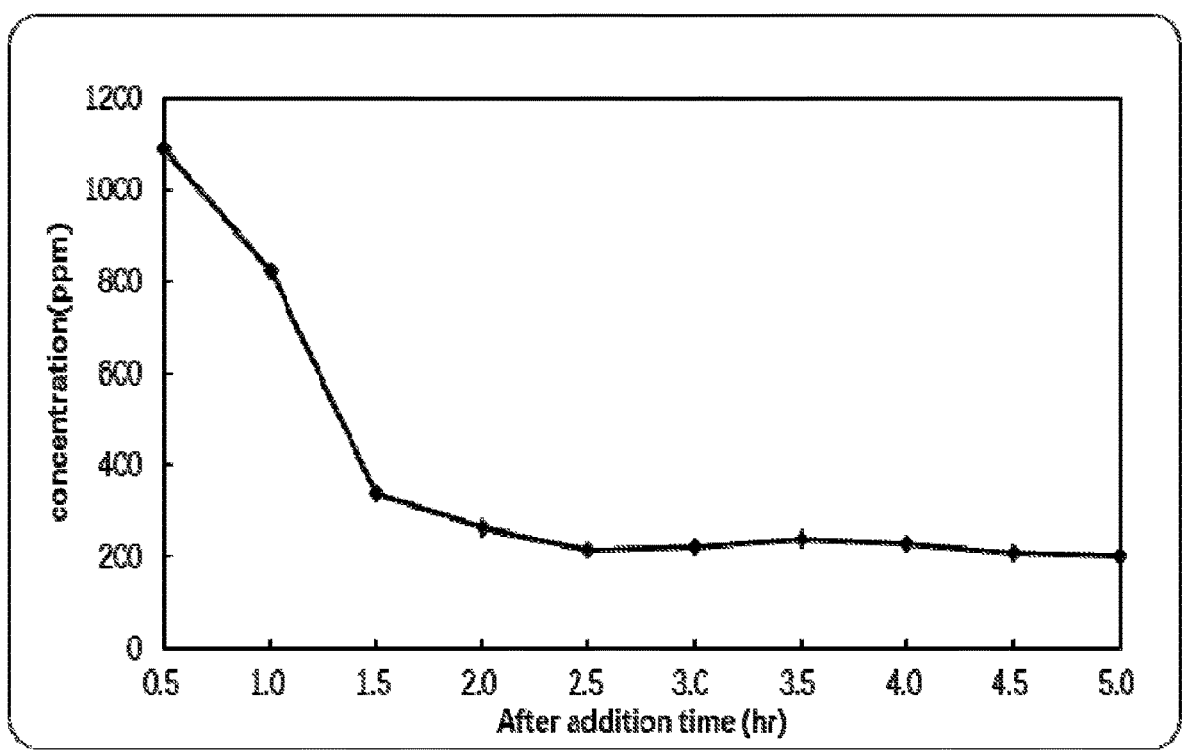
FIG. 2 is concentration profile of Sn tracking ions in the liquid phase after Sn tracking ions are injected into a designed 3 hr residence time co-precipitation reaction vessel.
Figure 3:
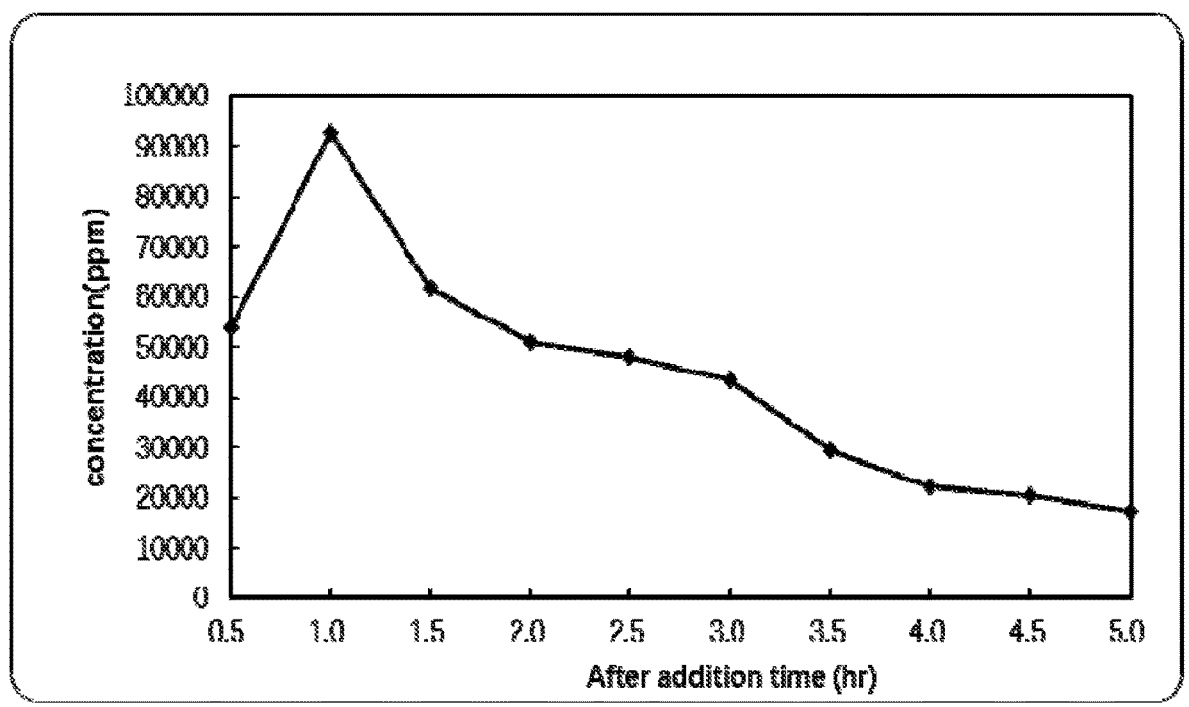
FIG. 3 is concentration profile of Sn tracking ions in the precipitated particles after Sn tracking ions are injected into a designed 3 hr residence time co-precipitation reaction vessel.

Inductively coupled plasma spectroscopy (ICP) is used to analyze the outflow of particles every 30 minutes in the liquid and in the solid. The results are shown in FIGS. 2 and 3. If the solid and the liquid were experiencing the same residence time, the distributions would overlay. Obviously, that is not the case, with the decay in concentration of the liquid tracer in FIG. 2 occurring faster than the solids tracer in FIG. 3. This means the particles are being held-up in this particular vessel for a longer time than the fluid, meaning the mass per volume within the tank is higher than would be predicted based on a mass balance of the system.

For the theoretical residence time distributions, the mean residence time can be calculated by volume of the reaction vessel divided by total inflow volumetric flow rate.

Figure 4:
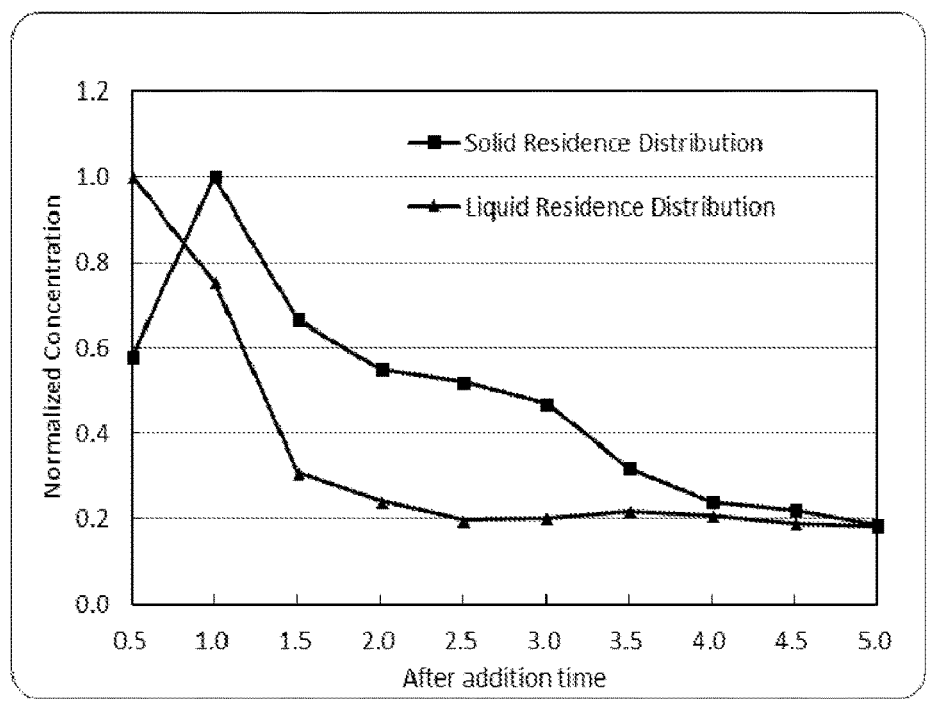
FIG. 4 is comparison of solid and liquid residence time distribution in example 1.

The residence time distributions from FIG. 2 and FIG. 3 can also be normalized and compared, as shown in FIG. 4. If the solid and fluid residence time is identical, the distribution should overlap. Since in FIG. 4 the liquid distribution peaks initially and decays to a stable value faster, it indicates the liquid in the vessel resides for a shorter time than the solids in the vessel. When this occurs, the solid mass per fluid volume will be higher than expected based on model calculations. By being able to visualize the distributions of the solid and the liquid, it is possible to determine if the outflow is resulting in too much or too little particle hold-up in the vessel.

Example 2

Adding Ba as Analytical Tracking Element During Co-Precipitation Reaction

A 4 L co-precipitation reactor with pH sensor and a heating jacket to maintain the temperature at 50° C. is filled with 10.2 g/L NH3 solution. Gentle stirring is started, and the pH is adjusted to 12. After the pH is set, the mixture is stirred at 1000 rpm. Separately, a 2 mol/L metal sulfate solution of CoSO4*7H2O, MnSO4*H2O and NiSO4*6H2O, with Co:Mn:Ni ratio of 0.1:0.15:0.75 is prepared in a separate tank. At the start of the reaction, the metal sulfate solution is fed into the vessel, along with aqua ammonia (25 wt %) and sodium hydroxide (30 wt %) to keep the NH3 and pH constant in the mixing vessel. The feeds are designed to give a 3 hr residence time from starting feeding. The collected product particles steadily leave the vessel via an overflow port. At the start of the second 3 hr, a 0.5M solution of $BaCl_2$ is pumped into the vessel for 30 minutes.

At the end of the 30 minutes of $BaCl_2$ addition to the vessel, the product including the precipitated particles and the fluid in the vessel is collected in increments of time. In the example, the product exiting the vessel is collected at intervals of 30 minutes (i.e., the product is collected every 30 minutes), with each time of collection lasting for 2 minutes. The product collected each time is separated via qualitative 11 um filter paper to obtain liquid (i.e., filtrate) and particles for additional testing.

Measuring the Residence Time of the Liquid and the Particles

Figure 5:
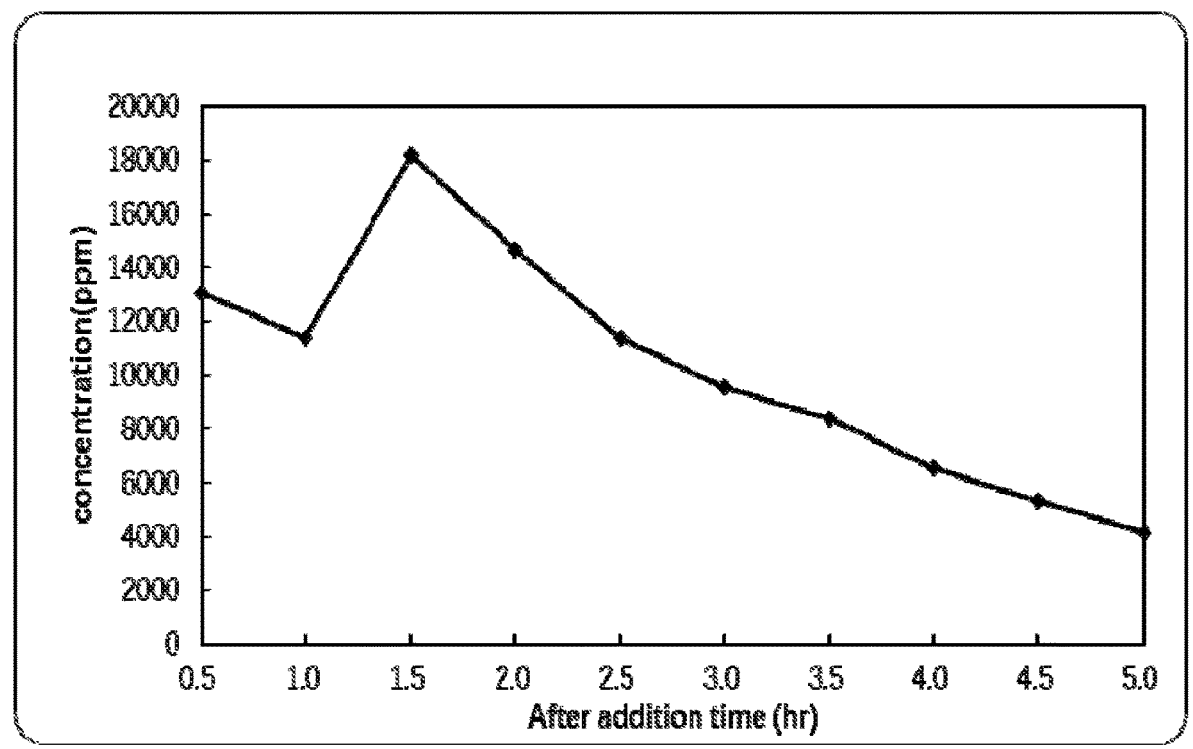
FIG. 5 is concentration profile of Ba ions changing with time in the collected co-precipitation product from a designed 3 hr residence time reaction vessel.

A PerkinElmer Optima 8000 Inductively coupled plasma spectroscopy (ICP) is used to analyze the outflow of particles every 30 minutes in the solid phase. The results on the solid phase are shown in FIG. 5. The solubility of Ba in the liquid phase is at the detection limit of the instrument, so results not shown.

From above, the present analytical method can be used to determine the preferred residence time of precipitated particles formed in a vessel during co-precipitation reaction, so that it is clear when the precipitated particles should be collected from the reaction vessel. For example, for a reaction vessel designed with 3 hr residence time, the precipitated particles in the reaction vessel is normally collected at 3 hr. However, according to the present analytical method, especially as shown in FIGS. 3-5, the precipitated particles should be collected after 3 hr (e.g., at 4 hr), not at 3 hr, since after 3 hr the concentration of the tracking ions in the precipitated particles has reached its mean residence time, so the particles under study are moving through the reaction process slower than expected. This demonstrates how the analytical technique can be used to analyze the co-precipitation reaction in vessels.

What is claimed is:

1. An analytical method for precipitated particles using a co-precipitation reaction, comprising:
   feeding two streams and a tracking metal into a reaction vessel; wherein the tracking metal is injected to the reaction vessel for a given time duration;
   collecting a precipitated product containing the tracking metal from the reaction vessel in increments of time to obtain product samples;
   filtering each collected product sample to separate precipitated particles from filtrate; and
   performing elemental analysis for the tracking metal in the precipitated particles of each collected product sample and measuring a concentration of the tracking metal in the precipitated particles, to obtain a residence time distribution of the precipitated particles in the reaction vessel according to the concentration of the tracking metal in the precipitated particles.

2. The method of claim 1, further comprising performing elemental analysis for the tracking metal in the filtrate of each collected product sample and measuring a concentration of the tracking metal in the filtrate, to obtain a residence time distribution of a fluid in the reaction vessel according to the concentration of the tracking metal in the filtrate.

3. The method of claim 2, wherein the concentration of the tracking metal in the filtrate decays to a stable value faster than in the precipitated particles.

4. The method of claim 1, wherein the method comprises feeding a stream (A) containing precipitation cation(s) and a stream (B) containing precipitation anion(s) into the reaction vessel, so that the stream (A) and the stream (B) are contacted to form the precipitated product.

5. The method of claim 4, wherein the stream (A) is selected from first row transition metals and has a concentration from 0.001-6 (mol cation/L).

6. The method of claim 4, wherein the stream (B) is selected from LiOH, NaOH, KOH, $Na_2CO_3$, $NaHCO_3$, $NH_3 \ast H_2O$, or any combination thereof and has a concentration from 0.001-14 (mol anion/L).

7. The method of claim 4, wherein the tracking metal is dissolved in the stream (A) or in the stream (B) when adding to the reaction vessel.

8. The method of claim 4, wherein the tracking metal is provided in a separate stream (C) when adding to the reaction vessel.

9. The method of claim 1, wherein the tracking metal is tracking ion of Sn or Ba.

10. The method of claim 9, wherein a feed concentration of the tracking ion is in a range between 0.001-1 (mol tracking ion/L).

11. The method of claim 10, wherein the feed concentration of the tracking ion is in a range between 0.1-1 (mol tracking ion/L).

12. The method of claim 9, wherein the tracking ion is selected from $Ba(NO_3)_2$, BaO, $Ba(OH)_2 \ast xH_2O$, BaS, $BaCO_3$, $BaSO_4$, $BaCl_2$, $BaBr_2$, $BaF_2$, $Ba(ClO_4)_2$, $SnSO_4$, $SnCl_2$, $Sn(NO_3)_2$, $SnBr_2$, $SnF_2$, $SnCO_3$, $Sn(OH)_2$, or any combinations thereof.

13. The method of claim 1, wherein at the start of a second 3 hr residence time from starting feeding, the tracking metal is added to the reaction vessel for 30 minutes, and at the end of the 30 minutes addition of the tracking metal to the reaction vessel, the precipitated product containing the tracking metal is collected and binned from the reaction vessel at intervals of 30 minutes.

* * * * *